United States Patent
Reinhardt

(10) Patent No.: US 10,281,072 B2
(45) Date of Patent: May 7, 2019

(54) HOSE CONNECTION

(71) Applicant: Neoperl GmbH, Mullheim (DE)

(72) Inventor: Holger Reinhardt, March/Buchheim (DE)

(73) Assignee: Neoperl GmbH, Müllheim (DE)

(*) Notice: Subject to any disclaimer, the term of this patent is extended or adjusted under 35 U.S.C. 154(b) by 149 days.

(21) Appl. No.: 15/316,281

(22) PCT Filed: Jun. 1, 2015

(86) PCT No.: PCT/EP2015/001106
§ 371 (c)(1),
(2) Date: Dec. 5, 2016

(87) PCT Pub. No.: WO2016/008557
PCT Pub. Date: Jan. 21, 2016

(65) Prior Publication Data
US 2018/0187807 A1 Jul. 5, 2018

(30) Foreign Application Priority Data
Jul. 18, 2014 (DE) .................. 20 2014 006 031 U

(51) Int. Cl.
*F16L 27/10* (2006.01)
*E03C 1/02* (2006.01)
*F16L 33/22* (2006.01)

(52) U.S. Cl.
CPC .......... *F16L 27/1017* (2013.01); *E03C 1/021* (2013.01); *E03C 1/025* (2013.01); *F16L 27/1021* (2013.01); *F16L 33/225* (2013.01)

(58) Field of Classification Search
CPC .. F16L 27/1017; F16L 27/1021; F16L 27/026
(Continued)

(56) References Cited

U.S. PATENT DOCUMENTS 3,414,299 A * 12/1968 Roe .................. F16L 19/04
285/234
3,891,246 A * 6/1975 Hopper ............. F16L 17/063
285/110
(Continued)

FOREIGN PATENT DOCUMENTS

DE 2711584 9/1978
DE 3309936 9/1984
(Continued)

*Primary Examiner* — James M Hewitt, II
(74) *Attorney, Agent, or Firm* — Volpe and Koenig, P.C.

(57) ABSTRACT

A hose connector (1) having a sleeve-shaped union nut (2) which (2) surrounds a sleeve-shaped connector part (3) that is connected to a hose end (4) of a flexible hose line (5) and that (3) has, at its end region oriented away from the hose end (4), an annular flange (6) which (6) bears rotatably against an annular shoulder (7) of a circumferential wall (8), and having at least one sealing ring (9) which is held in a retaining groove (10) provided on the outer circumferential side of the connector part (3) and radially seals an annular gap provided between the connector part (3) and the circumferential wall (8). Between the connector part (3) and the circumferential wall (8), there is provided a clearance that is dimensioned such that the connector part (3) and the circumferential wall (8) can be tilted with respect to one another.

13 Claims, 2 Drawing Sheets

(58) Field of Classification Search
USPC .................................. 285/184, 278, 280, 281
See application file for complete search history.

(56) References Cited

U.S. PATENT DOCUMENTS

| | | | | |
|---|---|---|---|---|
| 4,436,326 A | * | 3/1984 | Peaster | .................. F16L 27/00 |
| | | | | 285/148.27 |
| 2013/0049357 A1 | * | 2/2013 | Harr | .................... F16L 27/0816 |
| | | | | 285/184 |

FOREIGN PATENT DOCUMENTS

| | | |
|---|---|---|
| DE | 9005930 | 8/1990 |
| DE | 9400850 | 3/1994 |
| DE | 4430114 | 2/1996 |
| DE | 102010039541 | 2/2012 |
| EP | 0728978 | 8/1996 |
| FR | 1574082 A * | 7/1969 ............ F16L 27/047 |
| FR | 2543844 | 10/1984 |
| WO | 2012077549 | 6/2012 |

\* cited by examiner

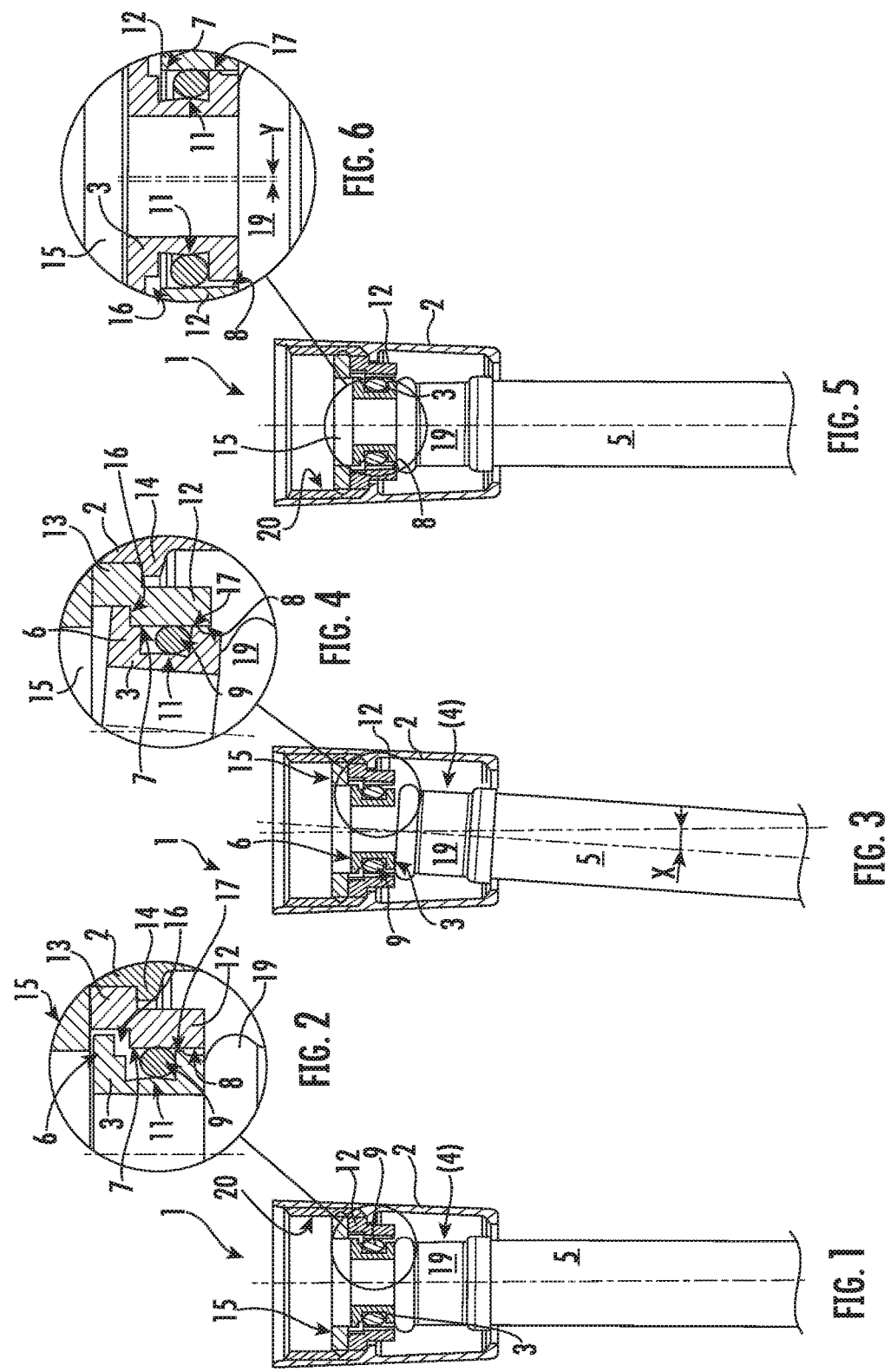

HOSE CONNECTION

BACKGROUND

The invention relates to a flexible hose line having a hose connector that has a sleeve-shaped union nut which surrounds a sleeve-shaped connector part that is connected to a hose end of the flexible hose line and that has, at its end region oriented away from the hose end, an annular flange which bears rotatably against an annular shoulder of a circumferential wall, and having at least one sealing ring which is held in a retaining groove provided on the outer circumferential side of the connector part and radially seals an annular gap provided between the connector part and the circumferential wall.

Flexible hose lines of the type mentioned in the introduction, which have at the hose ends the above-described hose connectors, are used in order, with the aid of these hose lines, to connect a fluid source—for example a sanitation corner or connector valve—to a fluid outlet—for example a hand-held shower head or a sanitation fitting. If the fluid outlets are to be handled as required, as is the case for example for a hand-held shower head, the known hose connectors are also configured in part so as to be freely rotatable about their longitudinal axis in order to simplify handling of such a hand-held shower head or similar fluid outlet. In order to seal the parting plane between the hose connector and the associated fluid inlet or fluid outlet, there are provided seals made of elastic material, generally in the form of O-rings. A drawback of this is that this O-ring can become caked with dirt particles or similar deposits, for example also with limescale, such that the ability of such hose connectors to rotate, which is in any case very limited for structural reasons, is in certain circumstances entirely prevented. In some cases, such dirt particles can also compromise the seal, possibly leading to serious damage.

The prior art also teaches hose connectors which have a lip seal instead of an O-ring, and which require a low break loose torque, but which also have the drawback that dirt can compromise the seal if, as a consequence of rotational movements, these dirt particles or similar deposits such as limescale are broken off.

WO 2012/077549 A1 already teaches a hose line of the type mentioned in the introduction having a hose connector that has a sleeve-shaped union nut which surrounds a sleeve-shaped connector part that is connected to a hose end of the flexible hose line. The connector part has, at its end region oriented away from the hose end, an annular flange which bears rotatably against an annular shoulder of a circumferential wall. A sealing ring is held in a retaining groove provided on the outer circumferential side of the connector part and radially seals an annular gap provided between the connector part and the circumferential wall. This sealing ring has a cylindrical part region which extends in the longitudinal direction of the connector part and bears against the groove bottom of the retaining groove, onto which part region there is integrally formed an annularly circumferential sealing lip that projects diagonally outward in the direction of the union nut.

SUMMARY

This gives rise to the object of providing a flexible hose line of the type mentioned in the introduction having a hose connector, whose functionality and rotatability can still be ensured for as long as possible even in the case of depositing dirt particles.

In the case of the hose line of the type mentioned in the introduction, the inventive solution to this object consists in that, between the connector part and the circumferential wall, and between the sleeve inner circumference of the union nut and the hose line, there is provided a clearance that is dimensioned such that the connector part and the circumferential wall can be tilted with respect to one another.

The hose connector according to the invention has a sleeve-shaped union nut by which the hose connector can be connected via a screw connection to an upstream- or downstream-side line section. The union nut surrounds an also sleeve-shaped connector part that is connected to a hose end of a flexible hose line. The connector part has, at its end region oriented away from the hose end, an annular flange which bears rotatably against an annular shoulder of a circumferential wall located in the sleeve interior of the union nut. In order to radially seal an annular gap provided between the connector part and the circumferential wall, there is provided at least one sealing ring which is held in a retaining groove arranged on the outer circumferential side of the connector part. Between the connector part and the circumferential wall, and between the sleeve inner circumference of the union nut and the hose line, there is provided a clearance that is dimensioned such that the connector part and the circumferential wall can be tilted with respect to one another. This tilting between the connector part and the circumferential wall is achieved by bending the hose line connected to the hose connector, and also by simply moving the hose line during use. Since the circumferential wall of the union nut and the connector part can be tilted with respect to one another, the sealing ring can easily break loose even when the union nut and the connector part are undesirably caked solid. Easy breakaway of the sealing ring avoids undesired caking solid of the union nut and of the connector part, which could otherwise hamper smooth rotation of these components of the hose connector. The circumferential wall having the annular shoulder can be provided on the inner circumferential side of the union nut. In this regard, an embodiment of the invention which is preferred and particularly reliable in terms of function provides that the hose connector has an intermediate ring which bears, on the circumferential wall bounding an annular opening, the annular shoulder, and which is held rotatably on the inner circumference of the union nut.

One refinement of the invention, which is worthy of protection in and of itself, provides that the retaining groove has a groove bottom which is configured as a convex curve. The retaining groove, which is provided for the at least one sealing ring, thus has a groove bottom which is configured as a convex curve. The sealing ring tightly clamped between the groove bottom and the circumferential wall is thus loaded tangentially in the case of a tilting movement, or the spherical or convex shape of the groove bottom and the sealing ring are oriented tangentially with respect to one another. Since the sealing ring thus bears on all sides with a reduced, circumferentially linear bearing surface, this makes it easier for the sealing ring to break away simply with a small tilt of the connector part relative to the union nut.

It is expedient if the annular flange and the annular shoulder provided on the circumferential wall can be rotated with respect to one another about the longitudinal axis of the hose connector. Such rotatability and/or rotational freedom of the hose connector according to the invention about the longitudinal axis thereof greatly facilitates the handling of a hand-held shower head or of another freely movable fluid outlet.

In order to hold the intermediate ring on one hand and the union nut on the other hand against one another such that they can be rotated, it is expedient if the intermediate ring includes, on the outer circumferential side of its end region oriented away from the hose end, an annular flange, which annular flange bears, preferably rotatably, against an annular shoulder or annular flange provided on the sleeve inner circumference of the connector nut. The rotatable connection between the intermediate ring on one hand and the union nut on the other hand makes it easier to screw the union nut onto the line end of an upstream- or downstream-side line section, and operation also allows positioning.

In order to prevent undesired egress of a portion of the fluid that is conveyed toward the hose connector, it is expedient if an annular seal bears against the end side, oriented away from the hose end, of the intermediate ring and axially seals an annular gap between the outer circumference of the intermediate ring and the inner circumference of the sleeve-shaped union nut.

One particularly advantageous embodiment, which ensures a good seal in the region of the hose connector, provides that the sealing ring and preferably also the annular seal are made of an elastic material.

In order to prevent tilting of the connector part not by the annular seal that bears against the end face of the intermediate ring, it is expedient if that end face of the connector part that is oriented away from the hose end is spaced apart from an adjacent end side of the annular seal.

One preferred refinement, which is worthy of protection in and of itself, provides that the annular flange provided on the connector part is of stepped configuration and has, on its flange inner side oriented toward the hose end, an annularly circumferential rabbet, which rabbet has an outer diameter that is smaller than the clear diameter of the intermediate ring. This rabbet forms a support edge which, even in the case of a tilting movement, ensures that the connector stub is held and remains concentric with respect to the intermediate ring and the union nut. The support edge formed by the rabbet facilitates the tilting movement of the connector stub in the union nut. The concentric arrangement of the connector stub with respect to the union nut and the intermediate ring ensures that the sealing ring properly seals the annular gap between the connector stub and the circumferential wall.

In that context, it is advantageous if the connector part can be tilted between a zero position arranged coaxially or axially parallel with the longitudinal axis of the union nut, and a tilted position angled relative to the longitudinal axis of the union nut, and if, in the tilted position, the annular groove, provided on the annular flange of the connector part, and the annular shoulder engage with one another at least in a part region of the circumference.

In order to facilitate a tilting movement between the connector part on one hand and the union nut and intermediate ring on the other hand, it is expedient if the edge that bounds the groove and is oriented toward the hose end is configured as a circumferential and preferably rounded projection, and if that part region of the connector stub that is oriented toward the hose end has an outer diameter which is smaller than the outer diameter of the projection.

In order that the sealing ring clamped between the connector stub on one hand and the circumferential wall on the other hand bears only in linear fashion against these components of the hose connector, it is advantageous if the sealing ring has a round or rounded ring cross section.

BRIEF DESCRIPTION OF THE DRAWINGS

Refinements of the invention can be found in the claims in conjunction with the description and the drawing. There follows a more detailed description of the invention with reference to a preferred exemplary embodiment.

In the figures:

FIG. 1 shows a hose connector illustrated in longitudinal section, having a sleeve-shaped connector part which is connected to a hose end and is surrounded by a sleeve-shaped union nut, wherein the union nut and the connector part are positioned relative to one another such that their longitudinal axes run approximately coaxially;

FIG. 2 shows the hose connector from FIG. 1 in an enlarged detail longitudinal section, in the region identified in FIG. 1 between the connector part and the union nut;

FIG. 3 shows a longitudinal section through the hose connector shown in FIGS. 1 and 2, wherein the connector stub is tilted slightly relative to the union nut;

FIG. 4 shows a detail longitudinal section, similar to FIG. 2, of the circled region in FIG. 3 between the connector part and the union nut;

FIG. 5 shows a longitudinal section through the hose connector shown in FIGS. 1 to 4, wherein the longitudinal axes of the connector part and the union nut are axially parallel but laterally slightly offset with respect to one another;

FIG. 6 shows a detail longitudinal section, similar to FIGS. 2 and 4, of the circled region in FIG. 5 between the connector part and the union nut.

DETAILED DESCRIPTION OF THE PREFERRED EMBODIMENTS

Figure 7:
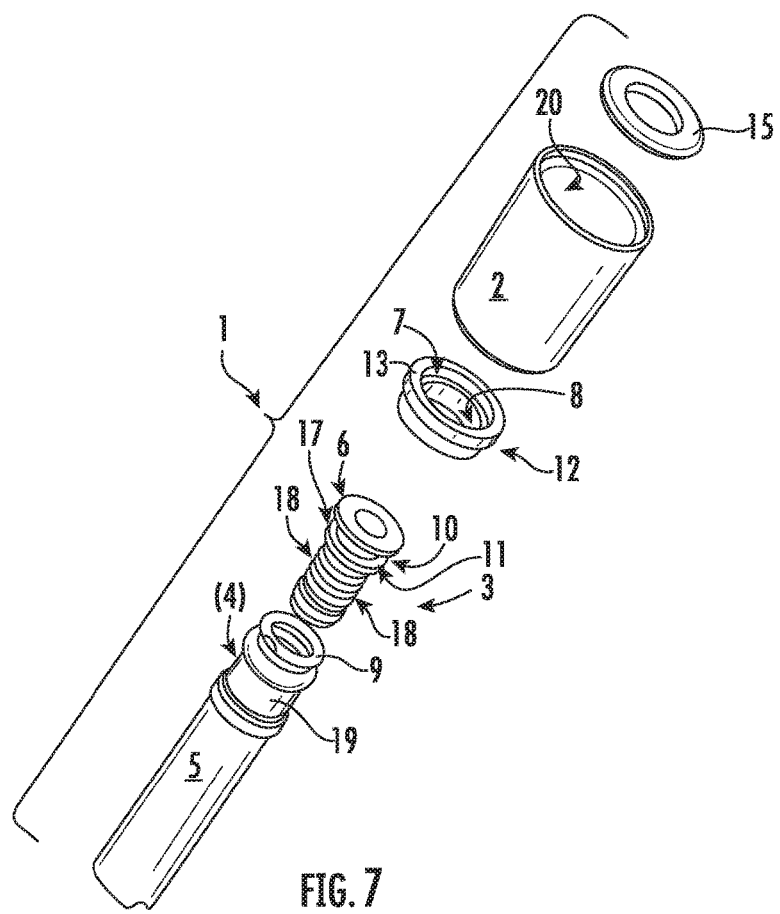
FIG. 7 shows the hose connector of FIGS. 1 to 6 in an exploded perspective illustration of its components.

FIGS. 1 to 7 illustrate a hose connector 1 for a flexible hose line 5, and in particular for a flexible sanitation water connector. The hose connector 1 has a sleeve-shaped union nut 2 by which the hose connector 1 can be connected via a hose connection to an upstream- or downstream-side line section, not shown in greater detail here. The union nut 2 surrounds an also sleeve-shaped connector part 3 that is connected to a hose end 4 of a flexible hose line 5. The connector part 3 has, at its end region oriented away from the hose end 4, an annular flange 6 which bears rotatably against an annular shoulder 7 of a circumferential wall 8 located in the sleeve interior of the union nut 2.

In order to radially seal an annular gap provided between the connector part 3 and the circumferential wall 8, there is provided at least one sealing ring 9 which is held in a retaining groove 10 arranged on the outer circumferential side of the connector part 3. Between the connector part 3 and the circumferential wall 8, there is provided a clearance that is dimensioned such that the connector part 3 and the circumferential wall 8 can be tilted with respect to one another. The retaining groove 10, which is provided for the at least one sealing ring 9, has a groove bottom 11 which is configured as a convex curve. The sealing ring 9 tightly clamped between the groove bottom 11 and the circumferential wall 8 is thus loaded tangentially in the case of a tilting movement, or the spherical or convex shape of the groove bottom 11 and the sealing ring 9 are oriented tangentially with respect to one another.

Since the sealing ring 9 thus bears on all sides with a reduced, circumferentially linear bearing surface, this makes it easier for the sealing ring 9 to break loose simply with a small tilt of the connector part 3 relative to the union nut 2. Easy breaking loose of the sealing ring 9 avoids undesired seizing of the union nut 2 and of the connector part 3, which could otherwise hamper smooth rotation between these components 2, 3 of the hose connector 1.

The circumferential wall 8 bearing the annular shoulder 7 could also be provided on the inner circumference of the sleeve-shaped union nut 2. However, in this case the hose connector 1 has an intermediate ring 12 which supports the annular shoulder 7 on the circumferential wall 8 bounding an annular opening. This intermediate ring 12 is rotatably held on the inner circumference of the union nut 2, thus making it easier to screw the union nut 2 onto the line end of an upstream- or downstream-side line section. This also makes it possible to rotate the hose during use.

As can be seen in FIGS. 2, 4 and 6, to that end the intermediate ring 12 includes, on the outer circumferential side of its end region oriented away from the hose end 4, an annular flange 13 which bears rotatably against an annular shoulder 14 or annular flange provided on the sleeve inner circumference of the union nut 2. An annular seal 15 bears against the end side, oriented away from the hose end 4, of the intermediate ring 12 and axially seals an annular gap between the outer circumference of the intermediate ring 12 and the inner circumference of the sleeve-shaped union nut 2. Both the sealing ring 9 of round ring cross section and the disk-shaped annular seal 15 are made of an elastic material.

FIG. 4 shows particularly clearly that the distance between the annular shoulder 7 provided on the intermediate ring 12 is greater than the height of the annular flange 6 projecting radially at the outer circumference of the connector part 3, and hence that end face of the connector part 3 that is oriented away from the hose end 4 is spaced apart from an adjacent end side of the annular seal 15 so as not to hinder a tilting movement of the connector part 3 relative to the union nut 2 and relative to the intermediate ring 12.

The detail longitudinal sections in FIGS. 2 and 4 show that the annular flange 6 provided on the connector part 3 is of stepped configuration and includes, on its flange inner side oriented toward the hose end 4, an annularly circumferential rabbet 16 which has an outer diameter that is smaller than the clear diameter of the intermediate ring 12. This rabbet 16 forms a support edge which, even in the case of a tilting movement, ensures that the connector part 3 is held and remains concentric with respect to the intermediate ring 12 and the union nut 2. The support edge formed by the rabbet 16 facilitates the tilting movement of the connector part 3 in the union nut 2. The concentric arrangement of the connector part 3 with respect to the union nut 2 and the intermediate ring 12 ensures that the sealing ring 9 can always properly seal the annular gap between the connector part 3 and the circumferential wall 8. In that context, the connector part 3 can be tilted between a zero position (shown in FIGS. 1 and 5) arranged coaxially or axially parallel with the longitudinal axis of the union nut 2, and a tilted position (shown in more detail in FIG. 3) angled relative to the longitudinal axis of the union nut 2. In the tilted position shown in FIGS. 3 and 4, the rabbet 16, provided on the annular flange 6 of the connector part 3, and the annular shoulder 7, arranged on the inner circumferential side of the intermediate ring 12, engage with one another.

A comparison of FIGS. 2, 4 and 6 shows that the edge of the connector part 3 that bounds the retaining groove 10 and is oriented toward the hose end 4 is configured as a circumferential and preferably rounded projection 17, and that that part region of the connector part 3 that is oriented toward the hose end 4 has an outer diameter which is smaller than the outer diameter of the projection 17.

In order to be able to connect the hose end 4 of the flexible hose line 5 to the connector part 3, the connector part 3 has a profiled connector nipple 18 (shown in FIG. 7) onto which the hose end 4 can be pushed. Once the hose end 4 of the hose line 5 has been pushed onto the connector nipple 18 of the connector part 3, the hose end 4 is secured in the axial direction on the connector part 3 by a crimp sleeve 19 that is crimped there.

In order to be able to connect the union nut 2 to the line end of an upstream- or downstream-side line section, that section of the sleeve-shaped union nut 2 that projects beyond the connector part 3 and the annular seal 15 is provided on its inner circumferential side with an internal thread 20. This internal thread 20 allows the union nut 2 to be screwed onto a mating thread provided on the line end of the upstream- or downstream-side line section, such that the annular seal 15 is clamped between the line end and the intermediate ring 12 provided in the union nut 2.

It is clear from FIGS. 1 to 7 that, between the connector part 3 and the circumferential wall 8 of the intermediate ring 12, and between the sleeve inner circumference of the union nut 2 and the hose line 5, there is provided a clearance that is dimensioned such that the connector part 3 can be tilted relative to the circumferential wall 8 of the intermediate ring 12. As shown in FIG. 6, this axial clearance also permits an eccentric displacement of the connector part 3 with respect to the intermediate ring 12 and the union nut 2. Conversely, in the detail longitudinal section shown in FIG. 2, the connector part 3 bears only on one side with its outer circumference against the circumferential wall 8 of the intermediate ring 12.

LIST OF REFERENCE SIGNS

1 Hose connector
2 Union nut
3 Connector part
4 Hose end
5 Hose line
6 Annular flange (on the connector part 3)
7 Annular shoulder (on the circumferential wall 8)
8 Circumferential wall
9 Sealing ring
10 Retaining groove
11 Groove bottom
12 Intermediate ring
13 Annular flange (on the intermediate ring 12)
14 Annular shoulder (on the sleeve inner circumference of the union nut 2)
15 Annular seal
16 Rabbet
17 Projection
18 Connector nipple
19 Crimp sleeve
20 Internal thread (on the union nut 2)

The invention claimed is:

1. A hose connector (1) for a flexible hose line (5), comprising a sleeve-shaped union nut (2) which surrounds a sleeve-shaped connector part (3), said sleeve-shaped connector part is adapted to be connected to a hose end (4) of the flexible hose line (5) and has, at its end region oriented away from the hose end (4), an annular flange (6) which bears rotatably against an annular shoulder (7) of a circumferential wall (8), at least one sealing ring (9) which is held in a retaining groove (10) provided on an outer circumferential side of the connector part (3) and radially seals an annular gap provided between the connector part (3) and the circumferential wall (8), and a clearance is provided between the connector part (3) and the circumferential wall (8), and between a sleeve inner circumference of the union nut (2) and the hose line (5), the clearance is dimensioned such that the connector part (3) and the circumferential wall (8) are tiltable with respect to one another, an intermediate ring (12) which includes the annular shoulder (7) on the circumferential wall (8) bounding an annular opening, said intermediate ring (12) is held rotatably on an inner circumference of the union nut (2), and the intermediate ring (12) includes, on an outer circumferential side of an end region thereof oriented away from the hose end (4), an annular flange (13) that extends radially outwardly, said annular flange (13) bears against an annular shoulder (14) provided on the inner circumference of the union nut (2).

2. The hose connector as claimed in claim 1, wherein the retaining groove (10) has a groove bottom (11) which is configured as a convex curve.

3. The hose connector as claimed in claim 1, wherein the annular flange (6) is rotatable about a longitudinal axis relative to the annular shoulder (7) of the circumferential wall (8).

4. The hose connector as claimed in claim 1, wherein an annular seal (15) bears against an end side, oriented away from the hose end (4), of the intermediate ring (12) and the annular seal (15) axially seals an annular gap between an outer circumference of the intermediate ring (12) and the inner circumference of the sleeve-shaped union nut (2).

5. The hose connector as claimed in claim 4, wherein the sealing ring (9) and also the annular seal (15) are made of an elastic material.

6. The hose connector as claimed in claim 5, wherein an end face of the connector part (3) that is oriented away from the hose end (4) is spaced apart from an adjacent end side of the annular seal (15).

7. The hose connector as claimed in claim 4, wherein the annular seal (15) is disk-shaped.

8. The hose connector as claimed in claim 1, wherein the annular flange (6) provided on the connector part (3) has a stepped configuration and includes, on a flange inner side oriented toward the hose end (4), an annularly circumferential rabbet (16), said rabbet (16) has an outer diameter that is smaller than a clear diameter of the intermediate ring (12).

9. The hose connector as claimed in claim 8, wherein the connector part (3) is tiltable between a zero position arranged coaxially or axially parallel with a longitudinal axis of the union nut (2), and a tilted position away from the longitudinal axis of the union nut (2), and in the tilted position, the rabbet (16), provided on the annular flange (6) of the connector part (3) and the annular shoulder (7) engage with one another at least in a part region of the circumference.

10. The hose connector as claimed in claim 1, wherein an edge that bounds the retaining groove (10) and is oriented toward the hose end (4) is configured as a circumferential projection (17).

11. The hose connector as claimed in claim 10, wherein a part region of the connector part (3) that is oriented toward the hose end (4) has an outer diameter which is smaller than an outer diameter of the projection (17).

12. The hose connector as claimed in claim 1, wherein the sealing ring (9) has a round ring cross section.

13. A hose line assembly comprising a flexible hose line and the hose connector as claimed in claim 1.

\* \* \* \* \*